United States Patent [19]

Hetherington

[11] 4,298,017

[45] Nov. 3, 1981

[54] AUTOMATIC FLUID COMPONENT SHUT OFF SYSTEM

[75] Inventor: Robert D. Hetherington, Sunland, Calif.

[73] Assignee: Poly-Glas Systems, Sun Valley, Calif.

[21] Appl. No.: 118,237

[22] Filed: Feb. 4, 1980

[51] Int. Cl.[3] .......... G05D 11/035

[52] U.S. Cl. .......... 137/1; 137/111; 137/114; 239/61

[58] Field of Search .......... 118/692; 137/100, 111, 137/114, 1; 239/61; 425/146

[56] References Cited

U.S. PATENT DOCUMENTS

| | | | |
|---|---|---|---|
| 1,753,662 | 4/1930 | Merker | 137/111 |
| 2,315,512 | 4/1943 | Everson | 137/114 |
| 2,583,986 | 1/1952 | Bahnson | 137/111 X |
| 2,664,909 | 1/1954 | Brock | 137/111 |
| 3,100,496 | 8/1963 | Reiser | 137/111 |
| 3,404,702 | 10/1968 | Telford | 137/100 |
| 3,770,198 | 11/1973 | Mihara | 239/61 X |
| 3,905,384 | 9/1975 | Berger | 137/111 |
| 4,005,803 | 2/1977 | Kent | 137/114 X |

*Primary Examiner*—Robert G. Nilson

*Attorney, Agent, or Firm*—Cislo & O'Reilly

[57] ABSTRACT

An Automatic fluid component Shut Off System which automatically shuts off the flow of one component in a plural component system when the pressure in another component falls below a predetermined amount. The system is comprised of pneumatically operated sources of fluid components such as a catalyst and a resin which are mixed as they are sprayed on an article. The automatic shut off system is comprised of a pressure sensing valve which is connected to one of the components to provide a pressure control point and controls the supply of air to an air operated servo valve controlling the flow of the other fluid component. The pressure control point is established by adjusting an air pressure regulator connected in series with the pressure sensing valve.

16 Claims, 2 Drawing Figures

AUTOMATIC FLUID COMPONENT SHUT OFF SYSTEM

BACKGROUND

This invention relates to a flow control system and more particularly relates to the automatic shut off of one fluid when another fluid falls below a predetermined pressure.

In the manufacture of articles in which plural components are simultaneously mixed and sprayed on the article it is imperative that the ratio between the two fluids be maintained. In plural component systems the critical component is the catalyst which is carefully controlled in order to assure the proper mixture and curing of the resin. If the catalyst flow falls below a desired amount the mixture is effective causing the manufacture of defective parts. The catalyst and resin supply systems are controlled by pneumatically operated devices. Gauges are provided but the operator of the spraying equipment is not always aware of the actual pressure. In some cases he may manufacture several parts before he realizes the mixture is defective. This can result in not only a waste of considerable material but defective parts which are unusable. In some cases the mixture may only be slightly below the required amount and the defective parts may be distributed without realizing that there was an improper mixture. This can result in extra cost for the defective part, because of the necessity of utilizing longer cure times in order to correct the defect as well as the potential complete waste of completely defective parts which cannot be corrected.

SUMMARY

The purpose of the present invention is to provide an automatic fluid component shut off system assuring that the proper mixture of fluid components is maintained to prevent production of defective parts.

The purposes of the present invention are achieved by a pressure sensing and regulating system which automatically shuts off one component when a critical component falls below a predetermined control pressure. To accomplish this a pressure sensing valve is connected to a control pressure signal from the critical component and regulates or controls the supply of air to an air operated valve which controls the flow of the second component. The control pressure is set by a metering valve to a predetermined flow pressure point. The sensitivity of the pressure sensing valve is then adjusted to the control pressure point such that the second component will be delivered as long as the first component is above the control pressure point. The metering valve may then be adjusted to the operating level of the critical component. Whenever the critical component falls below the preset flow pressure control point of the pressure sensing valve it will activate, shuting off the flow of air to the second component supply system stopping the flow of that component to the spraying equipment or gun. Since the critical component control pressure may vary depending upon the particular part being manufactured and other circumstances, a sensitivity pressure regulator is provided to adjust the sensitivity of the pressure sensing valve to equalize or balance the pressure of the control pressure signal. Once the sensitivity of the pressure sensing valve has been properly adjusted for the control pressure signal of the critical component any decrease in the flow pressure in the critical component below this preset value will automatically shut off the other component.

This system is especially effective for plural component systems utilizing a catalyst and a resin. The critical component is the catalyst which must be controlled such that a sufficient amount of catalyst is mixed with the resin in order to produce a non-defective article or part. When the amount of catalyst falls below an amount sufficient to produce a correct mixture defective parts will be produced or additional curing time or methods for curing will be needed increasing the expense of manufacturing parts. The automatic component shut off system of the present invention thus senses the flow pressure of the catalyst and automatically shuts off the resin when the flow pressure of the catalyst falls below a predetermined preset control pressure. When the flow pressure of the catalyst falls below a predetermined amount it is not readily apparent therefore a defective part could be manufactured without the operator being aware of it. A loss of pressure in the resin component will immediately be obvious to an operator permitting him to shut off the system before any defective parts are produced.

It is one object of the present invention is to provide an automatic fluid component shutoff system which senses the pressure in a critical component and shuts the other component off when the pressure in the critical component falls below a predetermined value.

Another object of the present invention is to provide a automatic fluid component shut off system which senses the pressure in a critical component.

These and other objects of the invention will become apparent from the following detailed description when considered in conjunction with the accompanying drawings wherein.

DESCRIPTION OF THE PREFERRED EMBODIMENT

Figure 1:
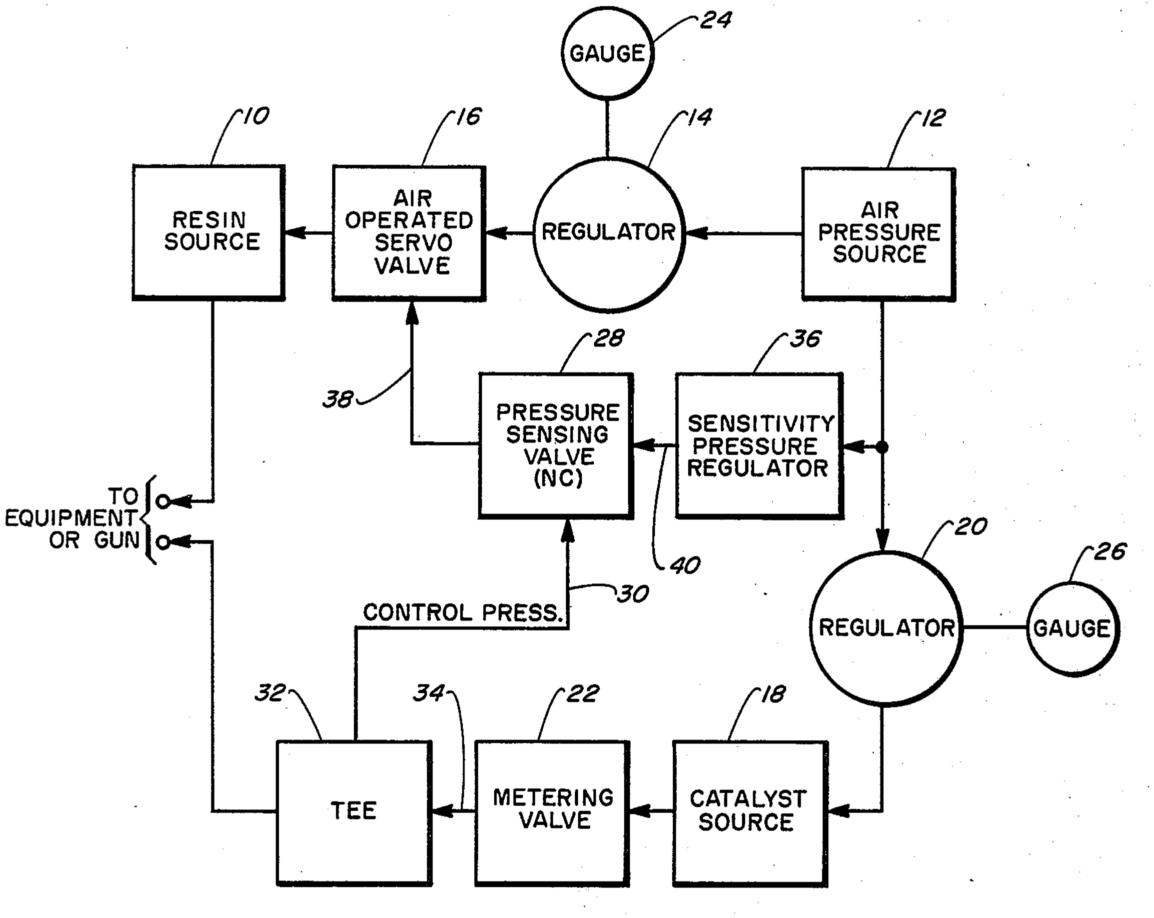
FIG. 1 is a block diagram of the automatic fluid component shut off system of the invention.

Referring to FIG. 1 there is shown a block diagram of a plural component supply system including the automatic fluid component shutoff system of the invention. The fluid component supply systems generally are comprised of a resin source 10 which usually consists of a resin pump and reservoir which are pneumatically operated from an air source 12 thru an air pressure regulator 14. The flow of catalyst is controlled by a metering valve 22. The catalyst source 18 may be a catalyst pump as shown and described in U.S. patent application Ser. No. 46,969 or may be a pressure vessel connected through the regulator 20 to the air source 12. The catalyst from the catalyst source 18 is delivered simultaneously with the resin to mixing and spraying equipment or a spray gun as indicated.

When the amount of catalyst flowing to the mixing equipment or spray gun falls below a predetermined amount defective parts can be produced. The defective parts may have to be discarded resulting in a considerable amount of loss. This can be avoided if the operator of the spraying equipment constantly monitors the gauges as well as a flow meter (not shown) connected to the metering valve 22. However because the mixing and spraying equipment is usually used in mass production of parts the equipment operator may manufacture a number of parts before he may notice the incorrect flow of catalyst occuring. Thus it would be advantageous to a manufacturing process to provide a system for automatically stopping the flow of the resin when the flow of catalyst falls below a predetermined level because an incorrect flow of catalyst will not be immediately recognizable as a loss in the flow of resin.

Therefore in order to shut off the flow of resin when catalyst flow pressure falls below a preset level a pressure sensing valve 28 is provided which is connected by a line 30 to a tee 32 in the catalyst flow line 34. The pressure sensing valve 28 is in turn connected to the air source 12 through a sensitivity pressure regulator 36 which permits adjustment of the sensitivity of the pressure sensing valve 28. The pressure sensing valve 28 and sensitivity pressure regulator 36 are connected in the air supply line 38, 40 delivering air from the air pressure source 12 to pneumatically operated servo valve 16 and therefore can control the flow of air to the pneumatically operated valve. The regulator 36 controls the sensitivity pressure in line 40 which flows thru the pressure sensing valve 28 to the line 38 to operate the servo valve 16.

Figure 2:
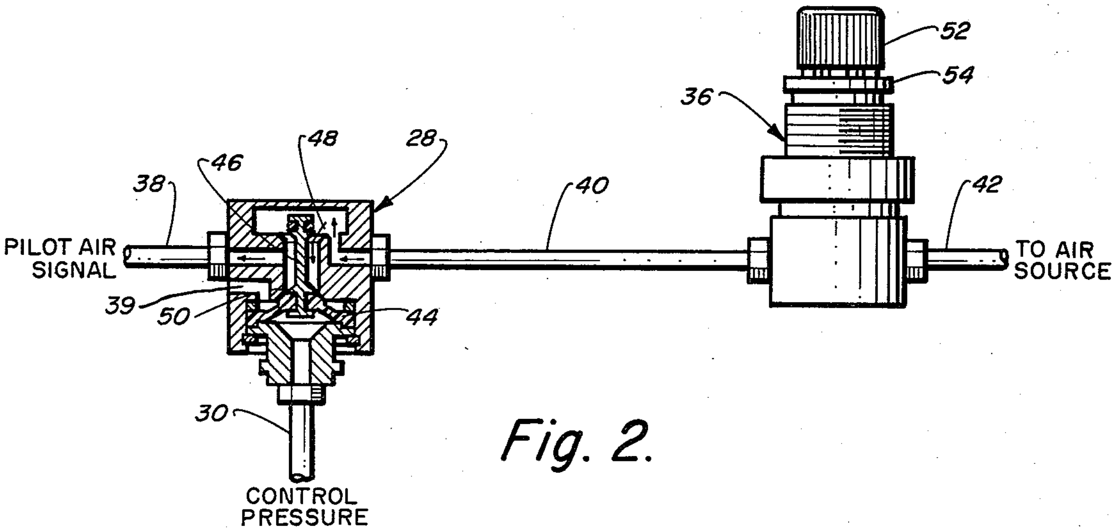
FIG. 2 is a semischematic drawing illustrating the pressure sensing and sensitivity adjustment devices according to the invention.

The operation of the pressure sensing valve and sensitivity pressure regulator are shown in FIG. 2. The pressure sensing valve 28 is comprised of a diaphragm 44 connected thru a stem 46 to a valve 48 for opening and closing a pathway from air supply line 40 to air supply line 38. The diaphragm normally biases the valve 48 into a closed position. When a pressure control signal is applied to line 30 it forces the diaphragm to the position shown closing valve 50 and opening valve 48 allowing the flow of air from air source 12 thru line 42 to provide a pilot air signal in line 38 to operate servo valve 16. As long as the pressure control signal on line 30 stays above a predetermined pressure control point air will flow thru lines 38, 40, and 42 to the air operated servo valve allowing air to be delivered to the resin source to supply resin to the mixing or spraying equipment or gun. When the pressure control signal from the catalyst side of the system falls below the preset pressure control point the diaphragm will bias valve 48 closed and valve 50 open exhausting air from the air operated servo valve 16 via port 39, thereby closing the valve 16 and shutting off the supply of resin.

The sensitivity pressure regulator 36 is used in conjunction with the metering valve 22 to establish a pressure control point in line 30 on the pressure sensing valve 28. This is accomplished by establishing a minimum flow control pressure on line 30 by first adjusting metering valve 22 to a predetermined pressure. The sensitivity pressure regulator 36 is then adjusted by means of knob 52 to establish an equalizing or balancing pressure on line 40 against the opposite side of diaphragm 44 in pressure sensing valve 28. Thus the pressure on pressure sensing valve 28 will be slightly less than or equal to the pressure control point on diaphragm 44 established in line 30. The metering valve may now be adjusted to the operating pressure which will be above the pressure control point established by adjustment of the metering valve 22 and sensitivity pressure regulator 36. If at any time the flow of catalyst thru the tee 32 to the equipment or gun falls below the preset control pressure point the air pressure flowing thru the pressure sensing valve 28 will exert a pressure above the control point causing diaphragm 44 to close valve 48 shutting off the air supply to line 38 which is vented through port 39 closing air operated servo valve 16 shutting off the resin source.

The resin source 10 is generally a reservoir containing resin and a pneumatically operated pump which is supplied with air through the air operated servo valve 16. The catalyst source 18 may be a pressure vessel having pressure applied thru a regulator 20 from air pressure source 12 or pneumatically operated catalyst pump as disclosed and described in U.S. patent application Ser. No. 46,969.

The sensitivity pressure regulator 36 as adjusted by the knob 52 and can be locked by means of locking collar 54 which prevents adjustments or variations of the control pressure point. The locking ring 54 is pushed downward preventing the adjustment knob 52 from being rotated. The sensitivity pressure regulator may be a minature regulator type R04 manufactured by Norgren Co. of Littleton, Colo. The regulator 36 is a reliable minature regulator having a "snap action" lock on the adjusting knob as a standard feature to prevent a change in the regulator adjustment once it has been set.

Thus there has been disclosed and described a automatic fluid component shutoff system which senses the fluid pressure in one fluid component delivery system and shuts off the other fluid component delivery system should the first fluid component delivery system fall below a predetermined pressure point. Preferrably the control pressure point is established by the critical component or the component which is least obvious to the operator if it should fall below minimum pressure flow.

Obviously many modifications and variations of the invention are possible in light of the above teachings. It is therefore to be understood that the full scope of the invention is not limited to the details disclosed herein and may be practiced otherwise than as specifically described within the spirit and scope of the appended claims.

What is claimed is:

1. An automatic fluid component shutoff system comprising:

a first fluid component source;

a second fluid component source;

pneumatically operated means for controlling the flow of said first and second fluid components;

pressure sensing means connected to sense the flow pressure of one of the said fluid components;

said pressure sensing means adapted to shut off the flow of the other of said fluid components when the flow pressure of said one fluid component drops below a predetermined pressure control point;

adjustable sensitivity pressure regulating means for adjusting the sensitivity of said pressure sensing means whereby said fluid component shutoff system may be adjusted for different pressure control points of said one fluid component.

2. The system according to claim 1 wherein said pressure sensing means includes means for controlling the flow of air to said pneumatically operated means whereby when the pressure sensed drops below a predetermined amount the air supply to said pneumatically operated means is shut off.

3. The system according to claim 2 wherein said adjustable sensitivity pressure regulating means for adjusting the sensitivity of said pressure sensing means comprises an air regulating means for adjusting the air pressure on said sensing means.

4. The system according to claim 3 wherein said air regulating means is connected to act as an equalizing means whereby the air pressure is equalized against a predetermined pressure of said one fluid component.

5. The system according to claim 4 wherein said pressure sensing means is a normally closed valve.

6. The system according to claim 5 wherein said normally closed valve is held in the open position by the flow pressure of said one fluid component.

7. The system according to claim 6 wherein said pneumatically operated means includes an air operated servo valve; said air operated servo valve being connected to said pressure sensing means whereby when the pressure in said one fluid component drops below a preset amount said servo valve is shut off.

8. The system according to claim 7 wherein said one fluid component is a catalyst and said other fluid component is a resin.

9. The system according to claim 8 wherein said first fluid component source is a catalyst pump.

10. The system according to claim 8 wherein said first fluid component source is a catalyst pressure vessel.

11. The system according to claim 1 including means for setting a pressure control point on said pressure sensing means.

12. The system according to claim 11 wherein said means for setting a control pressure comprises; a metering valve means for metering the flow of said one of said components.

13. The system according to claim 12 wherein said metering means is adjusted in conjunction with said air regulating means to establish said pressure control point.

14. A method for shutting off the flow of resin in a plural component system when the catalyst pressure falls below a predetermined minimum flow pressure comprising:

connecting a pressure sensing valve in the air supply to a pneumatically operated servo valve controlling the supply of resin;

sensing the flow pressure of said catalyst with said pressure sensing valve;

establishing a pressure control point by metering the flow pressure of catalyst to said pressure sensing valve at which said valve will shut off the flow of air to said servo valve thereby shutting off the flow of resin;

regulating the air flow through said pressure sensing valve to equalize the flow pressure of said catalyst.

15. The method according to claim 14 wherein the step of regulating the air flow through said pressure sensing valve comprises:

connecting an adjustable air pressure regulator in the air supply to said pressure sensing valve;

adjusting the air pressure regulator to the control pressure point of said catalyst flow.

16. The method according to claim 15 wherein said pressure sensing valve is connected to remain open as long as the flow pressure of said catalyst is greater than the pressure control point.

* * * * *